United States Patent Office 2,885,447
Patented May 5, 1959

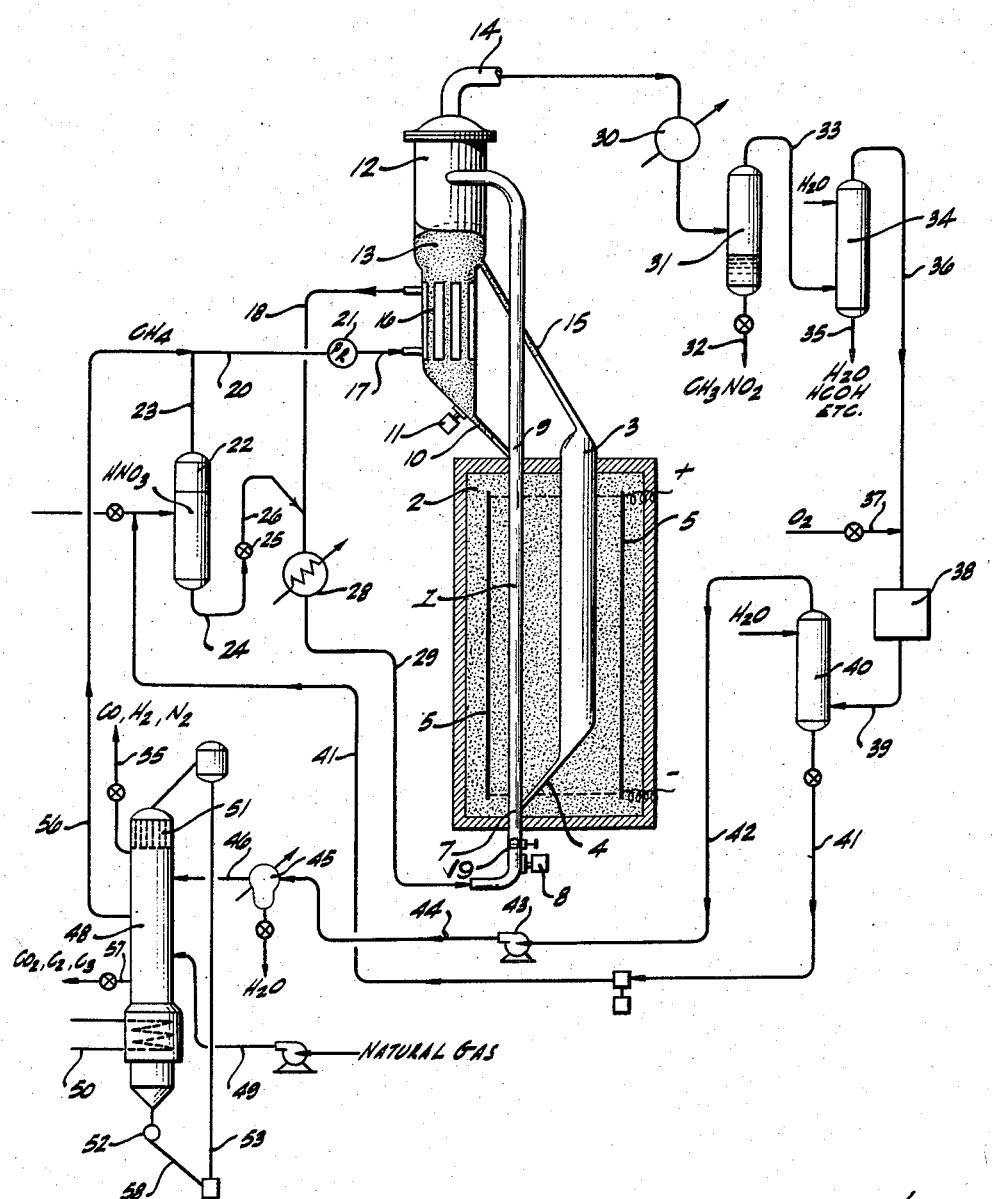

2,885,447

METHOD FOR CONDUCTING EXOTHERMIC VAPOR-PHASE REACTIONS

Art C. McKinnis, Long Beach, and Davis A. Skinner, Fullerton, Calif., assignors to Union Oil Company of California, Los Angeles, Calif., a corporation of California Application August 27, 1954, Serial No. 452,688

8 Claims. (Cl. 260—644)

This invention relates to the preparation of lower nitroalkanes by the vapor-phase nitration of paraffins, and particularly to the nitration of methane to form nitromethane. It also relates, more broadly, to a general procedure for obtaining efficient temperature control in exothermic, vapor-phase reactions requiring short contact times.

It is known that methane can be nitrated with nitric acid in the vapor phase at temperatures between about 400° and 500° C. to produce nitromethane in yields ranging from about 5% to 20% based on nitric acid. The present invention relates more specifically to certain improvements whereby the nitration may be accomplished with the production of maximum yields of nitromethane, a minimum of by-products, and with greater economy in terms of equipment capacity, upkeep and initial cost. Broadly speaking, the process comprises forming a vaporous mixture of methane and nitric acid, flowing the gaseous mixture through a tubular reactor concurrently with suspended, finely divided, inert heating solids, and then rapidly terminating the heating when the optimum conversion has taken place. It has been found that substantial economies in initial equipment investment and in operating and maintenance expenses are achieved when the reaction is conducted in the presence of concurrently flowing, dispersed heating solids, and especially when the linear velocity of the gases is maintained well into the turbulent flow range, and above the flame-propagation velocity.

The term "concurrent flow," as applied to fluidized solids suspended in a gas stream distinguishes over "static" fluidized beds of solids in that the residence time of the concurrently flowing solids in the reaction zone is substantially the same as the residence time of the gases. In static fluidized beds the solids residence time usually is several hundred times larger than the gas residence time, and may be infinitely larger. In the present case, the solids residence time is between about 0.5 and 1.6 times the gas residence time, depending upon the size of solids, gas velocity, direction of flow and other factors.

The successful vapor phase nitration of methane was first described in U.S. Patents 2,161,475 and 2,164,774 issued to G. K. Landon. Both of those patents describe the nitration of methane with nitric acid by passing the vaporized reactants through open tubular reactors which were externally heated to maintain a reaction temperature of about 375° to 550° C., the contact time ranging between about 0.005 and 1.0 second. The use of externally heated tubular reactors is disadvantageous from the standpoint of efficient heat transfer. If large diameter tubes are employed, a considerable length of the reactor is necessarily devoted to preheating the gases to reaction temperature. When reaction temperature is reached, the exothermic nature of the reaction causes a further temperature rise, which is difficult to control. It will be understood that if the temperature either exceeds or falls short of the optimum range, undesirable side reactions will proceed at a relatively faster rate than at the optimum temperature. Moreover, it is difficult to correlate temperature and contact time in such manner as to maintain an optimum relationship between those variables. In order to overcome the poor heat transfer characteristics of externally heated reactors and the resulting marked temperature gradients in the reaction zone, H. B. Hass and his coworkers employed tubular reactors of very small diameter (5 mm.) and 180 feet in length (Industrial and Engineering Chemistry, volume 39, page 919). The extreme length of the reactor presumably was required in order to obtain a higher ratio of heating surface to contact time, whereby more effective temperature control could be realized.

The use of small tubular reactors of great length is disadvantageous from the standpoint of initial cost, upkeep, and the necessarily large pressure drop through the reactor. Great difficulty is often encountered in the breaking and plugging of such reactors with entrained foreign materials. Frequent shut-downs for repair and cleaning purposes are hence necessary. Presumably in order to overcome some of these difficulties it has been proposed recently to employ fluidized solids for heating the reactants. U.S. Patents 2,512,587 and 2,654,788 describe fluidized bed techniques wherein finely divided heating solids are maintained in the reaction zone as a substantially static fluidized bed through which the gases must pass. The use of static, or "batch" fluidized beds has now been found to be disadvantageous for several reasons.

In the first place, the gas velocity cannot exceed the settling velocity of the solids, which is ordinarily between about 2 and 6 ft. per sec. Since the gas velocity must be low, the reaction must be completed in a relatively short reaction zone in order to achieve proper contact times. The low gas velocity and the short length of the reaction zone lead to various other difficulties, the nature of which depend to some extent upon whether large or small diameter reactors are employed.

If small diameter tubes (below about 1 inch) are employed, it is not possible to achieve turbulent flow of the low-velocity gases. Streamline flow causes an uneven cross-sectional distribution of solids, with resultant uneven heating. Undesirable flamar reaction may develop in sections of the reactor which are relatively free of solids. It will be understood that the normal gas velocity through static fluidized beds is insufficient to exceed the flame propagation rate in the absence of solids. It has been found that no nitromethane is produced in the flamar reaction.

On the other hand, large diameter reactors (above about 4 inches), while permitting in some cases the attaining of over-all turbulent flow, cannot limit the turbulence to localized segments. As a result the partially reacted products are continuously intermixed with incoming fresh reactants, and relatively fresh reactants are mixed with relatively more completely reacted gases. Therefore, even though the desired flat temperature profile may be maintained in large diameter reactors by employing static fluidized beds, the over-all mixing of reactants throughout the bed prevents the attaining of a uniform contact time for each increment of reactants. This factor is highly important in processes requiring very short contact times, and wherein the ratio of contact time to temperature is also critical. Moreover, the distribution of heating solids in the gases is frequently not homogeneous under conditions of turbulence generated by low gas velocities. This results in the formation, essentially, of gas bubbles which are relatively free of heating solids. Such bubbles may develop flamar reaction, thereby further decreasing the yield of nitromethane. All of these factors together have been found to result in substantially lower yields of nitromethane than may be obtained by employing either (1) high gas velocities through elongated, small diameter, externally heated tubular reactors, or (2) high gas velocities through reactors heated internally by means of suspended solids.

From the above discussion it will be apparent that by employing continuous concurrent flow of heating solids with the gases the chief disadvantages of both the externally heated tubular reactors and the static fluidized bed reactors are avoided. Thus, it is possible to obtain yields of nitromethane equal to or superior to those obtained in externally heated, small-tube reactors, while employing shorter reactors of substantially larger diameter.

It will be apparent therefore that the principal object of the invention is to avoid the economically disadvantageous characteristics of small diameter, externally heated tubular reactors without suffering any decrease in over-all conversion efficiency or nitromethane yield. Still another object is to avoid the low yields characteristic of the heretofore employed static-bed fluidized processes. A still further object is to provide means for rapidly quenching the reaction products. Another object is to provide novel means for recovering and recycling unreacted methane and nitric oxide. Other objects and advantages will be apparent to those skilled in the art from the description which follows.

The raw materials for the present process comprise mainly methane from any suitable source, either pure or impure, and nitric acid of substantially any concentration ranging between about 20% and 100%. Fuming nitric acid may be employed in some cases. If higher nitroalkanes are desired, the corresponding paraffin is normally employed, e.g. ethane, propane, etc. The methane employed herein may comprise natural gases which contain for example between about 1% and 20% by volume of other gases such as ethane, propane, hydrogen and the like. In one particular modification of the process to be described more specifically hereinafter, an impure natural gas may be treated by selective adsorption and rectification on charcoal in conjunction with a recycle stream from the reactor to produce an essentially pure methane stream for the reaction. If it is desired to produce only nitromethane, and if the natural gas contains appreciable quantities of ethane or propane, it is desirable to remove those latter constituents inasmuch as they are selectively attacked by the nitric acid. The higher hydrocarbons also tend to increase the ratio of oxygenated compounds to nitrated compounds in the product gases, thereby lowering the yield of nitromethane from nitric acid.

A desirable procedure for forming the reaction mixture consists in passing preheated methane or natural gas through a liquid body of nitric acid. Just sufficient heat may be supplied to the liquid nitric acid to saturate the methane vapors. It is desirable to avoid overheating the nitric acid vapors before contact with the heat transfer solids in the reaction zone. Overheating tends to decompose the nitric acid to nitrogen oxides. Ordinarily it is preferable to introduce the mixed reactants to the reaction zone at a temperature between about 110° and 200° C. The final preheating to reaction temperature is then rapidly accomplished by means of the heating solids.

In all cases, a molar excess of methane should be employed. However, it is not necessary to employ herein the very large mole excesses of methane which have sometimes been employed in the past to act merely as a heat control medium. In the present case it is found that very little advantage is gained by employing more than about 15 moles of methane per mole of nitric acid, and it is preferred to employ between about 8 and 12 moles. These preferred mole ratios effectively utilize the nitric acid, and yet are not so high as to unduly encumber the subsequent nitromethane recovery and purification systems. When large excesses of methane are employed, it is difficult to condense out the nitromethane economically.

It is not essential that the reactant gases be mixed with each other before being introduced into the reaction zone. Either the methane or the nitric acid may be introduced singly into the lower part of the reactor, and the other reactant may be introduced downstreamwardly. If nitric acid is injected downstreamwardly, it may be introduced either as a liquid or a gas. However, unless very large ratios of heating solids to gases are employed, it is preferred to introduce the nitric acid in vapor form to avoid undue cooling of the solids by vaporization, resulting in a heterogeneous temperature profile.

Various catalytic materials may be included in the feed gases if desired. Such catalysts include halogens, e.g. chlorine, bromine, or halogen compounds in small proportions, ranging between about 0.01% and 5.0% by volume of total gases. Oxygen or air in similar proportions may also be employed. These catalytic materials usually give increased yields of nitromethane and oxygenated compounds.

The heating solids and the feed gases may be admixed in any suitable manner, as by flowing the solids at the reaction temperature into a stream of the relatively cool reactants or reactant. The gas flow rate is sufficiently above the solids settling velocity to provide turbulent flow and substantially complete inter-mixing of solids and gases within a few inches from the point of introduction of solids. The temperature of the reaction may vary between about 400° and 600° C., and is preferably correlated with the contact time, lower temperatures being employed for longer contact times and vice versa. The contact times may vary between about 0.01 and 2.0 seconds, and preferably between about 0.1 and 1.0 second.

The internal dimensions of the reaction tube, and the velocity of the gases therein constitute critical interrelated factors herein. In order to avoid the above mentioned difficulties in connection with small diameter tubes it is preferable to employ reactors at least about one inch in diameter, and up to about 8 inches or more. It is desirable to maintain in such reactors a gas velocity which is substantially above the settling velocity of the solids, above the flame propagation rate, and well into the turbulent flow range. In tubes having the above dimensions, all three of these requirements are met by any gas flow rate between about 20 and 180 feet per second. For any given gas velocity it will be apparent that the contact time and/or temperature will determine the length of the reactor tube.

The preferred gas velocity range is between about 25 and 50 feet per second. Higher gas velocities may result in undesirably high erosion rates on the walls of the reactor and the solids separator as a result of the abrasive action of the solids. This effect is particularly pronounced where the fluid suspension must flow through bends in conduits, and/or where the solids are separated by centrifugation as in a cyclone separator. However, it should be understood that where straight-through conduits are employed, and where a large separating chamber is permissible such that the solids may be separated without substantial impact or abrasion against wall surfaces, the higher gas velocities, up to about 180 ft./sec., may be employed, and are advantageous from the standpoint of providing more localized turbulence. The more localized the turbulence, the shorter may be the reaction zone.

When large diameter reactors are employed, e.g. between about 3 inches and 8 inches, it is preferred to employ temperatures in the lower ranges in order to permit the use of longer contact times, whereby in turn longer reactors may be employed. The use of long tubes prevents the excessive inter-mixing of increments of reactants which are at appreciably different stages of reaction, thereby providing more equal contact times for each increment. Slowing down the reaction by means of lower temperatures, and lengthening the reaction zone, permits the averaging-out of contact times for each increment of reactants. These incremental contact times might be appreciably different if a short reaction tube were employed at high temperatures, whereby the percent of the total reaction taking place per linear inch of reactor is relatively large. The following table summarizes certain approximate optimum relationships between reactor dimensions, reaction temperature and contact time, where the gas velocity is maintained constant at about 35 ft. per sec.:

TABLE 1

| Internal diameter of tube, inches | 1.0 | 2.0 | 4.0 | 6.0 |
|---|---|---|---|---|
| Length of tube, feet | 4.7–7 | 9.5–14 | 19–28 | 28–42 |
| Reaction temperature, °C | 500–480 | 470–450 | 450–440 | 440–420 |
| Contact time, sec | 0.13–0.2 | 0.26–0.4 | 0.5–0.8 | 0.8–1.2 |

It will be understood however that by employing higher gas velocities, e.g. 50 to 180 ft./sec., the above values for contact time and reactor tube length may be scaled downwardly by going to higher temperatures, e.g. 490°–600° C.

The nitration may be conducted at substantially any desired pressure up to about 800 p.s.i.g. Best results are ordinarily obtained at pressures between about 0 and 200 p.s.i.g.

The solids employed herein for heating the gases may comprise any suitably inert, finely subdivided material such as powdered quartz, crushed vitreous silica, ground Pyrex glass and the like. Any other material may be employed which is chemically stable, inert and solid at the reaction temperature. The material may be employed in particle sizes ranging from about 50 to 250 mesh, and preferably between about 100 and 200 mesh. The proportion of heating solids employed may range between about 4 and 50 pounds per pound of total reactants, the optimum proportion depending upon contact time, temperature of the feed gases, state of subdivision of the solids, etc.

In a desirable modification of the process, a separate body of the powdered solids may be maintained at a sufficiently low temperature to quench the product gases, and may be aspirated into the reactor tube at the point where it is desired to stop the reaction. By such means the reaction gases may be very rapidly cooled to below about 200° C. if desired. The resulting mixture of product gases and total solids is then passed into the solids separation zone wherein the solids are decelerated or centrifuged away from the gases.

The product gases may then be withdrawn and subjected to various known procedures for recovering nitromethane, formaldehyde, formic acid, methanol, unreacted nitric acid and the like. The remaining gases, comprising mainly methane, nitric oxide, nitrogen, carbon monoxide and carbon dioxide may then be admixed with sufficient oxygen to convert the nitric oxide to nitrogen dioxide. Upon water scrubbing the oxidized gases a solution of nitric acid is obtained which may be recycled, with or without intermediate concentration, to the nitration step. The remaining gases are ordinarily not suitable for recycle as such, and hence may be further treated to remove carbon oxides, nitrogen, hydrogen and the like to prevent their buildup in the system. These components may be removed by selective adsorption and rectification on granular adsorbents, advantageously in conjunction with purification of the feed gases, as will be more fully described hereinafter.

Reference is now made to the accompanying drawing which illustrates, partly in elevation and partly in cross-section, a suitable nitration reactor for laboratory or pilot plant operation. Various feed gas and product gas treating systems are illustrated schematically in conjunction therewith. The principal piece of apparatus consists of a tubular reactor 1 which may be composed of Pyrex glass, quartz, or any suitably inert material such as gold, platinum, or any type of metallic tube lined with Pyrex glass, gold or the like. The reactor is illustrated as being disposed vertically for upward flow of gases, but the gas flow may be at any desired angle either upwardly, downwardly or horizontally. Reactor 1 is disposed within a constant temperature furnace 2, which may be packed with a suitable heat-transfer material such as sand. Also disposed within the furnace 2 is a heating solids reservoir 3, communicating at its lower end through an inclined feed leg 4 with the lower end of reactor tube 1. The furnace 2 is illustrated as being heated by means of electrical resistance rods 5.

The heating solids employed herein flow by gravity through inclined feed leg 4 and are entrained into the upflowing feed gases entering at 7. In some cases it may be found that the solids are not sufficiently free flowing, and hence an electrical vibrator 8 may be attached to the system to provide suitable vibrations, preferably in the low sonic range, to facilitate the flow of solids.

The reaction zone in reactor 1 is substantially entirely enclosed within the constant temperature furnace 2. The nitration is terminated at an upper point indicated at 9 by entry into reactor 1 through feed leg 10 of a stream of solids which have been cooled to substantially below the nitration temperature. These solids likewise are aspirated or entrained into the rising gas stream. The flow of cool solids through feed leg 10 may also be facilitated by means of a vibrator 11.

The upper end of reactor 1 communicates tangentially with the interior of a centrifugal separating chamber 12, wherein solids are caused to settle by gravity and centrifugation into a lower bed 13, and product gases are removed overhead through line 14. The solids 13 will be at a temperature somewhat lower than the reaction temperature, and hence a part thereof is diverted through conduit 15 to hot solids reservoir 3 for reheating. The remainder of the solids at 13 gravitate downwardly through an indirect heat exchange zone 16 wherein they are further cooled, for example by heat exchange with feed gas entering through line 17 and exiting through line 18. The relative flow rates of hot and cold solids may be conveniently controlled by varying the diameter of cold solids transfer leg 10 and/or hot solids transfer leg 4. A butterfly valve 19 is provided below solids-entry point 7 in order to prevent the solids in reservoir 3 from flowing downwardly into the feed supply system when feed gases are not being passed into the reactor.

In a continuous process utilizing the above described reactor, cool methane at above the desired nitration pressure is brought in through feed line 20 from a source hereinafter described, and is passed through pressure reducing valve 21 and thence through line 17 to be preheated in heat exchanger 16. A liquid nitric acid reservoir 22 communicates via manifold line 23 with the high pressure methane line 20. The high pressure forces liquid nitric acid through line 24, flow rate control valve 25, and line 26 into low-pressure, preheated methane line 18. The methane in line 18 aspirates the liquid nitric acid and carries it into a vaporizer 28 wherein vaporization of the nitric acid is completed. The mixed gases leaving vaporizer 28 pass via line 29 into the lower end of reactor tube 1, wherein reaction occurs as previously described.

The gaseous products removed through line 14 are first cooled in condenser 30 and passed to separator 31 from which liquid nitromethane is withdrawn via line 32. The remaining gases are withdrawn overhead through line 33 and subjected to countercurrent scrubbing with water in scrubbing vessel 34. The aqueous wash liquor withdrawn through line 35 contains formaldehyde, formic acid, methanol, and unreacted nitric acid. These various materials may be separated and purified by known methods.

The unabsorbed gases from separator 34 are withdrawn through line 36 and admixed with air or other oxygen-containing gas admitted through line 37. The proportion of oxygen added should be at least sufficient to oxidize the nitric oxide to nitrogen dioxide, a reaction which occurs rapidly and spontaneously. A surge vessel 38 may be employed to allow completion of the reaction, although it is ordinarily not necessary. Care should be exercised in admixing oxygen in order to avoid explosive proportions of oxygen and hydrocarbon. The gases from surge vessel 38 are then passed via line 39 into a second countercurrent scrubbing vessel 40, wherein they are again scrubbed with water to convert the nitrogen dioxide to nitric acid and to dissolve the latter. The resulting aqueous nitric acid is withdrawn through line 41 and may be recycled directly to nitric acid feed reservoir 22. Alternatively, the nitric acid may be concentrated by distillation if desired.

The unabsorbed gases from scrubber 40 ordinarily contain significant proportions of carbon monoxide, carbon dioxide, and nitrogen, and smaller amounts of hydrogen and nitrous oxide. In order to remove at least most of these components so that the remaining methane may be recycled to the process, all or part of the gases in line 42 may be repressured, preferably to about 200 p.s.i.g. by means of blower 43 and passed via line 44, water condenser-separator 45, and line 46 to the upper portion of a selective adsorption-rectification column 48. The recycle methane is purified in column 48 in conjunction with fresh feed gases admitted to a lower point in the column through line 49. Both streams of gas are purified essentially by flowing them countercurrently against a descending stream of granular charcoal or other adsorbent material, and maintaining an increasing temperature gradient downwardly in column 48 by means of heater 50 and cooler 51.

Selective adsorption unit 48 is of the type shown in U.S. Patent No. 2,519,873 and consists essentially of a cool adsorption zone, a hotter rectification zone, a stripping zone, a charcoal rate controller 52 and a lift line 53. Recycle gas entering through line 46 flows upwardly through descending cool charcoal which selectively adsorbs methane and carbon dioxide, permitting the less readily adsorbed components such as CO, $H_2$, $N_2$ and $N_2O$ to flow upwardly and be removed via line 55. It will be understood that the gases taken off through line 55 are ordinarily not free of methane, but are at least substantially enriched in the non-hydrocarbon components mentioned. The adsorbed methane on the cool charcoal flows downwardly and is desorbed in the intermediate rectification zone by rising vapors of higher molecular materials e.g. $CO_2$, ethane, propane, etc.

The fresh feed gas entering through line 49 is introduced at a lower point in the adsorption unit in order to separate higher hydrocarbons such as ethane and propane from the methane. The temperature in the unit at the point of introduction of fresh feed gas is such as to cause the methane to flow upwardly without being appreciably adsorbed while the heavier components flow downwardly on the charcoal in the adsorbed state. The downwardly flowing charcoal flows into a desorption zone heated by means of heater 50, thereby effecting desorption of most of the heavier compoñeents which pass upwardly where they again displace methane from the descending charcoal. The operation is somewhat analogous to fractional distillation; the purified methane stream is taken off as an intermediate cut through line 56, and the heaviest components are removed through a lower discharge line 57. The methane removed through line 56 is essentially at the pressure prevailing in the adsorption unit and hence is depressured through pressure reducer 21 as previously described.

The hot charcoal from regulator 52 passes downwardly through line 58 whence it is lifted through lift line 53 and returned to the top of the adsorption unit. The lifting may be effected in any suitable manner as by gas lift or mechanical elevators. At the top of the adsorption unit the hot charcoal is cooled by means of cooler 51 to condition it for adsorption of additional gas.

The methane produced through line 56 may be of any desired purity depending on the particular process requirements. Ordinarily it is undesirable and unnecessary to attempt to attain 100% purity. Methane ranging between 95% and 99% purity may very readily be obtained by operation of the selective adsorption unit, and gas streams of this purity are ordinarily satisfactory.

The following examples may serve to illustrate some specific aspects of the invention, and the results obtainable thereby, but the details should not be construed as limiting in scope.

*Example I*

A laboratory reactor similar to that illustrated in the drawing was constructed wherein the reactor tube was 4 millimeters in inside diameter and 19 inches in length. A feed mixture of pure methane and nitric acid was prepared by metering the liquid, 22% nitric acid into the methane conduit, and leading the dispersion into a vaporization chamber containing ⅛ inch glass spheres. The temperature of the vaporizer was controlled at between 150° and 170° C. The mole ratio of methane to nitric acid was 8.5/1. The gaseous mixture was passed at atmospheric pressure through the reactor at a linear flow rate of about 20 feet per second, and hot solids preheated to a temperature of about 520° C. were entrained into the gas stream at the lower end of the reactor. The solids consisted of powdered quartz of 100–200 mesh size, and were supplied at the rate of about 9.5 pounds per square foot of reactor cross-section per second. The reaction was terminated at the upper extremity of the reactor by a centrifugal separator, and the gases were immediately quenched. Under these conditions the contact time is about .07 to .09 second. The conversion of nitric acid to nitromethane was 17.5 mole percent.

*Example II*

By repeating the nitration described in Example I, but admitting with the feed gases a proportion of oxygen approximately equal to the mole-ratio of nitric acid, the conversion to nitromethane was 25.2%. However, 0.325 mole of formaldehyde per mole of nitric acid was formed, while in the absence of oxygen only .095 mole of formaldehyde was formed. This example shows that by employing oxygen substantially higher conversions of nitric acid to nitromethane may be obtained at the expense of a higher conversion of methane to formaldehyde and other oxygenated products.

*Example III*

The procedure described in Example I is repeated employing a reactor having an internal diameter of 1.5 inches, and approximately 6 feet in length. The gas flow rate is about 50 feet per second, the solids flow rate is about 21 pounds per square foot of reactor cross-section per second, and the reaction temperature is about 500° C. The yield of nitromethane is 18.2%, showing that the scale effects in going from a small diameter to a large diameter reactor are negligible or favorable when employing concurrently flowing fluidized solids. Nitromethane yields of about 18–20% are typical in reactors ranging up to at least 8 inches in diameter.

*Example IV*

To show the effect of higher pressure, the procedure of Example III is repeated using the 1.5 inch reactor, and a pressure of 110 p.s.i.g. The higher pressure results in a conversion of nitric acid to nitromethane amounting to about 23%.

*Example V*

In order to compare the continuous bed process with static bed operation, a parallel nitration was carried out in a batch-type fluidized bed of solids. The apparatus consisted of a 1.25 inch inside diameter Pyrex tube 8 inches in length. The fluidized bed of powdered 100–200 mesh quartz particles was about 2 inches in depth. Methane was carbureted through 100% nitric acid and passed through the bed at a number of different temperatures and flow rates known to be within the optimum range. The highest conversion of nitric acid to nitromethane obtainable amounted to 4%. The inferiority of such static bed fluidized operations is attributed mainly to the variable solids concentration in the reaction zone and uneven contact times. Even when the depth of the fluidized bed is increased to 8 inches by using lower temperatures, thereby permitting longer over-all contact times, the conversion to nitromethane is less than about 6%.

Example VI

Another series of nitrations was carried out in an open, externally heated tube 23½ inches in length and 1 inch in inside diameter. The reactor was immersed in a molten lead bath in order to obtain the best possible temperature control, and preheated mixtures of methane and nitric acid were led through the reactor under various conditions at atmospheric pressure. The conversions were as follows:

TABLE 2

| Bath Temp., °C. | $CH_4/HNO_3$ Ratio | Contact Time, sec. | Percent Conversion of $HNO_3$ to $CH_3NO_2$ |
| --- | --- | --- | --- |
| 426 | 11.8 | 0.39 | 8.5 |
| 440 | 11.8 | 0.38 | 10.6 |
| 450 | 11.8 | 0.38 | 10.7 |
| 415 | 11.8 | 0.5 | 9.4 |
| 427 | 10.0 | 0.5 | 13.1 |
| 435 | 11.8 | 0.5 | a 13.7 |
| 440 | 11.8 | 0.5 | 13.7 |
| 450 | 11.8 | 0.5 | 12.7 | a Maximum conversion reported by Hass and Boyd (Ind. Eng. Chem. 39, 919) in this type reactor was 12.5%.

Even lower conversions are obtained at higher temperatures and shorter contact times. This example shows that externally heated, large diameter tubes are not capable of producing the nitromethane yields obtainable in a continuous fluid bed.

By employing substantially the same procedures described above, and employing the same apparatus, other exothermic vapor phase reactions may be carried out, employing either a single reactant or a plurality of reactants. Those exothermic reactions which are benefited by maintaining a substantially constant reaction temperature, and which require a limited reaction time, i.e. less than about one minute, are most advantageously adapted to the herein described process. In all cases, the solids are introduced into a relatively cool stream of the feed gas, the solids being preheated to the desired reaction temperature. Examples of some of the reactions which may be so carried out are as follows:

(1) The oxidation of paraffin hydrocarbons to give various intermediate oxidation products, such as the oxidation of methane to formaldehyde in the presence of oxygen, with or without added oxides of nitrogen. Such reactions are generally conducted at temperatures between about 400° and 750° C. with contact times between about 0.05 and 2.0 seconds. Higher paraffins may be similarly oxidized to form the corresponding oxidation products.

(2) The oxidation of methane or other paraffin hydrocarbons with chlorine, bromine or other halogen to give incompletely halogenated products such as ethyl chloride, methylene dichloride, chloroform, ethyl bromide, ethylenedibromide and the like. Such reactions may be carried out at temperatures of about 300 to 500° C. with contact times ranging between 0.1 and 3.0 seconds.

(3) The oxidation of ammonia with chlorine to give hydrazine. This reaction is generally conducted at temperatures between about 0° and 250° C. and with contact times ranging between 0.5 and 5.0 seconds.

Obviously many other exothermic reactions may be similarly carried out either in the presence or absence of catalyst. The foregoing disclosure should therefore not be considered as limiting in scope, since many variations may be made by those skilled in the art without departing from the scope or spirit of the following claims.

We claim:

1. In the vapor phase nitration of methane the improvement which comprises forming at a temperature between about 100° and 200° C. a gaseous feed mixture comprising nitric acid and a mole-excess of methane, flowing said feed mixture through an elongated reaction zone, heating said feed mixture to reaction temperature and maintaining said reaction temperature substantially constant throughout said reaction zone by flowing finely-divided, inert heating solids in dispersed phase concurrently with the feed mixture through said reaction zone, said heating solids having been preheated to a nitration temperature between about 400° and 600° C., the linear velocity of said feed mixture through said reaction zone being between about 20 and 200 ft. per second and at all times substantially exceeding the settling velocity of said solids therein maintaining said heating solids in contact with said feed mixture for a contact time between about 0.05 and 2.0 seconds, and then immediately cooling the reaction gases to below reaction temperature, and recovering nitromethane from the cooled gases.

2. A process as defined in claim 1 wherein the cross-sectional area of said reaction zone is between about 0.8 and 50 square inches, and wherein the gas velocity therein is in the turbulent flow range, between about 25 and 75 ft. per second.

3. In a process for the vapor phase nitration of methane with nitric acid at a reaction temperature between about 400° and 600° C. and a contact time between about 0.05 and 2.0 seconds, wherein said reaction temperature is maintained by intimately contacting said reactants with inert, finely-divided, fluidized heat-transfer solids, the improvement which comprises continuously flowing said heat-transfer solids preheated to the desired reaction temperature through a reaction zone concurrently with said gaseous reactants, the linear velocity of said gaseous reactants being in the turbulent flow range between about 20 and 200 ft. per second, the solids residence time in said reaction zone being between about 0.5 and 1.6 times the residence time of said gaseous reactants, whereby a substantially uniform temperature and solids-distribution throughout said reaction zone is obtained, and rapidly quenching the reaction gases and recovering nitromethane.

4. A process as defined in claim 3 wherein the cross-sectional area of said reaction zone is between about 0.8 and 50 square inches, and wherein the gas velocity therein is in the turbulent flow range, between about 25 and 75 ft. per second.

5. In a process for the vapor phase nitration of methane with nitric acid at a reaction temperature between about 400° and 600° C. and a contact time between about 0.05 and 2.0 seconds, wherein said reaction temperature is maintained by intimately contacting said reactants with inert, finely-divided, fluidized heat-transfer solids, the improvement which comprises continuously flowing said heat-transfer solids preheated to the desired reaction temperature through a reaction zone concurrently with said gaseous reactants, the linear velocity of said gaseous reactants being in the turbulent flow range between about 20 and 200 ft. per second, the solids residence time in said reaction zone being between about 0.5 and 1.6 times the residence time of said gaseous reactants, whereby a substantially uniform temperature and solids-distribution throughout said reaction zone is obtained, flowing the hot gas-solids suspension from said reaction zone into an induction zone, introducing into said induction zone a further quantity of said heat-transfer solids cooled to a temperature substantially below said reaction temperature and dispersing the same in said gases thereby rapidly lowering the gas temperature to below said reaction temperature, and thereafter recovering nitromethane.

6. A process as defined in claim 5 wherein the cross-sectional area of said reaction zone is between about 0.8 and 50 square inches, and wherein the gas velocity therein is in the turbulent flow range, between about 25 and 75 ft. per second.

7. In the vapor phase nitration of methane with nitric acid wherein a natural gas containing a major proportion of methane and a minor proportion of higher paraffins is employed as raw feed gas, and wherein the nitration products are treated for the recovery of nitromethane, oxygenated organic compounds and nitric oxide, leaving a crude recycle gas comprising methane, carbon monoxide, carbon dioxide and nitrogen, the improvement which comprises passing said raw feed gas and said crude recycle gas into the mid-section of a descending stream of granular adsorbent material wherein a rising temperature gradient is maintained downwardly, whereby the components of said gas streams are selectively adsorbed and desorbed, removing an overhead gas enriched in carbon monoxide and nitrogen, removing a methane-rich side-cut substantially free from carbon monoxide and higher paraffins, removing a third gas stream below said side-cut which is enriched in higher paraffins, and recycling said side-cut to said nitration.

8. A process as defined in claim 7 wherein said raw feed gas is introduced into said stream of granular solids at a point below the point of introduction of said crude recycle gas.

References Cited in the file of this patent

UNITED STATES PATENTS

| | | |
|---|---|---|
| 2,161,475 | Landon | June 6, 1939 |
| 2,164,774 | Landon | July 4, 1939 |
| 2,260,258 | Martin | Oct. 21, 1941 |
| 2,443,210 | Upham | June 15, 1948 |
| 2,512,587 | Stengel | June 20, 1950 |
| 2,519,873 | Berg | Aug. 22, 1950 |
| 2,654,788 | Marshall | Oct. 6, 1953 |
| 2,685,498 | Dickinson | Aug. 3, 1954 |
| 2,714,126 | Keith | July 26, 1955 |